Figure 1:
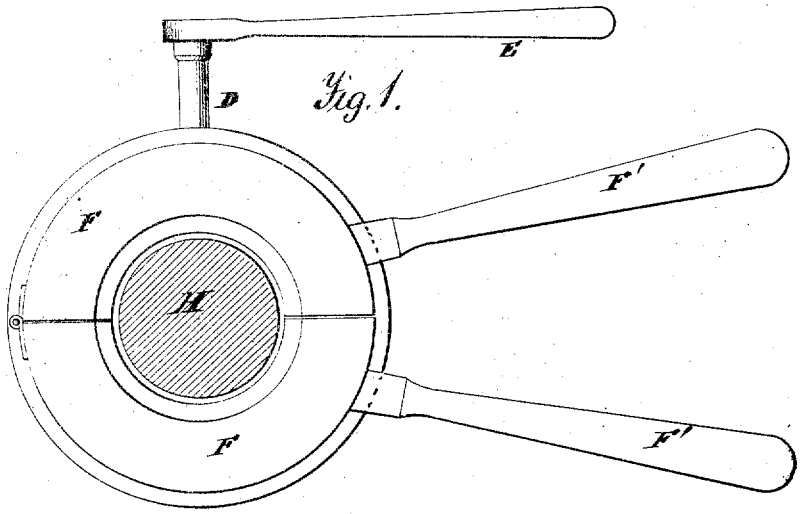

J. H. REIGHARD.

Molds for Glass-Ware.

No. 5,924. Reissued June 16, 1874.

J. H. Reighard

Inventor.

D. P. Holcomb & Co
Attys

Witnesses.

A. Rupert

A. C. Castell

BEST AVAILABLE COPY

UNITED STATES PATENT OFFICE.

JACOB H. REIGHARD, OF LOGANSVILLE, WISCONSIN, ASSIGNOR TO J. H. HOBBS, BROCKUNIER & CO.

IMPROVEMENT IN MOLDS FOR GLASSWARE.

Specification forming part of Letters Patent No. 125,083, dated March 26, 1872; reissue No. 5,922, dated June 16, 1874; application filed May 21, 1874.

*To all whom it may concern:*

Be it known that I, JACOB H. REIGHARD, of Logansville, Sauk county and State of Wisconsin, have invented certain Improvements in the Art of Manufacturing Pressed Glassware, and in molds used therefor; and I do hereby declare that the following is a full, clear, and exact description thereof, reference being had to the annexed drawings, in which—

Figure I is a top view of the mold. Fig. II is a vertical section thereof, and Fig. III is a vertical section of the lower section of the mold.

The same letters are employed in all the figures in the indication of identical parts.

This invention relates to improved means for manufacturing stemmed glassware by pressing in a mold; and consists, first, in an improved mode of pressing such ware by first pressing in a mold one part of the article to be manufactured, and afterward pressing onto such part the remainder of the article, the two parts becoming united at the point of juncture while still in a plastic state; secondly, in the mechanism for working such process, the mold including in its construction means for firmly holding the first-formed portion while the remainder is being pressed upon it, so as to unite the two parts; thirdly, in forming the mold in sections, having two plungers, by means of which the article may be manufactured in said sectional mold by two successive and distinct operations, by which one part of the article is first made, and afterward the remainder is pressed thereon.

Heretofore articles of stemmed glassware have been pressed in one piece, or when pressed in two pieces such pieces were afterward cemented by means of a piece of molten glass placed between them, which, when it became cold, formed a union with both parts, and thus completed the article. It is in order to avoid this mode of uniting the parts, by pressing one directly on the other, that my invention is intended. It is fundamentally necessary that the previously-formed piece should be rigidly held in such position that the newly-formed piece can be pressed upon it, and the union between the two be made so that when completed the article shall be of the desired form.

I have illustrated my invention as applied in a mold, in which a part of the article is first pressed, and then retained in proper position to have the remainder of the article pressed thereon.

The article to be made in the case illustrated is a hollow-stemmed champaghe-glass; but by altering the form, the invention may be applied to other kinds of stemmed glassware. The foot is formed in one part and the bowl in another, the two parts being independently pressed, so that the junction shall be formed in the stem.

Figure 2:
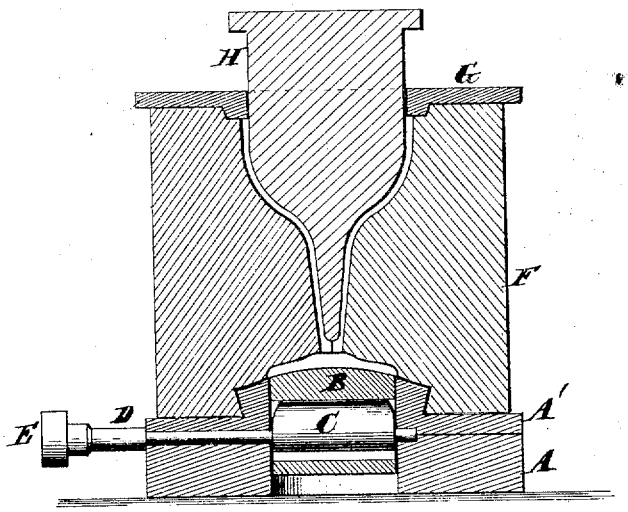
Figure 3:
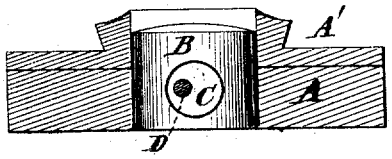

A refers to the base or lower portion of the mold, which may be of any desired form externally, such portion being of sufficient thickness to permit a pressing-die or plunger to work up and down in it. Upon the upper surface of this portion A there may be placed a thin plate of metal, having upon its upper surface, near or around the aperture formed in its center, a projecting beveled or dovetailed flange for the reception and retention of the upper portion of the mold when the two parts are to be used in connection with each other. Through a recess formed in the lower portion of this section of the mold, or partly in it and partly in the plate A′, a shaft passes, for a purpose soon to be described. B refers to the lower pressing-die or plunger, which is made to move in the aperture formed in this section, it being so arranged that when in its lowest position its upper surface will be below the upper surface of the projecting flange of plate A′, and thus form a receptacle in such plate for such an amount of molten glass, porcelain, or other material, as is required to form the base or lower portion of the article to be made. C refers to a cam or eccentric, which is placed upon a shaft which passes through an aperture in the plunger B, as shown in Fig. 2. This cam or eccentric is firmly secured to the shaft, so that as said shaft and cam are rotated, or partially rotated, the die or plunger shall be moved up and down in the aperture in which it is placed. D refers to the shaft above alluded to, it having its bearings in the section A of the mold, one of its ends projecting beyond the outer surface thereof for such a distance as to enable it to receive a lever or crank, by which it is operated. E refers to a lever, which is placed upon the end of the shaft D, and is used for giving motion to the same. F F refer to the upper sections of the mold, which consists of two parts hinged together, and so arranged as to part at their centers. In or upon the inner surfaces of these sections are formed cavities, each of the form of one-half of the outer surface of the article to be formed therein, or of so much thereof as is shaped and pressed in this (the upper) section of the mold. In the bottom of these sections, or in that portion which comes in contact with the lower section, there is formed an annulus of the shape required to cause it to fit upon the projecting flange formed upon the plate A′, so that, when the upper sections or parts F F have been opened, or so far separated as to allow them to be placed upon said lower section, they may be closed on said section by means of the handles F′ F′, and thus a tight joint formed between the two sections. G refers to a cap, which, when the two parts which form the upper section of the mold are closed together, fits upon such section, it being provided with a projecting flange upon its under surface, which enters a recess formed in the top of the said upper section, and thus serves to keep it in its proper position with reference thereto. Through the center of this cap there is formed an aperture, the diameter and shape of which are such as to receive the upper pressing-die or plunger H, and guide it in its movement while giving form to the upper portion of the article to be made. H refers to the upper pressing-die or plunger, its form being such as to give the required form to the interior of the goblet or other article which at the time it is desirable to make.

The operation of this device is as follows: The parts being constructed substantially as described, the lower section of the mold is placed upon a table, or in any other convenient place to be operated, when the lever E is thrown into such a position as to carry the lower die or plunger down to its lowest position, when the cavity or space in the plate A′ which is above such plunger is filled with the molten material to be used, when the upper section of the mold is at once placed upon said lower section, and closed tightly thereon by means of the handles F′, and the lever or crank is moved into such a position as to cause the plunger to rise, and thus press the material above it into the space which has been formed in the upper part of the mold to receive it, and give it its proper form, at which time a sufficient quantity of the molten material is placed in the cavity, and the upper die or plunger is placed in position, it having been previously removed, and any suitable press is used to force said upper die or plunger down, and thus is formed the upper portion of the vessel, and at the same time the two parts are united in consequence of the pressure applied to the material which is in the upper portion of the mold.

I am aware that articles of glassware have been made by blowing a part on a previously-molded part, and hence my application is confined to the use of molds for making both parts by pressure.

What I claim as my invention, and desire to secure by Letters Patent, is—

1. The mode of manufacturing stemmed glassware by pressing in a mold one part on another previously-molded part, so as to unite the two parts by a single seam while still in a plastic state.

2. A mold for forming articles of stemmed glassware, combining in its construction upper and lower sections and a plunger substantially as described, the said parts being so arranged that while a portion of the intended article is held in a recess in one section, the remainder of the article can be formed on it by pressure of the plunger acting on molten glass in the other section.

3. A mold for forming articles made of glass, porcelain, and other similar substances, said mold being constructed in sections, and in the manner described, so that one portion of the article to be made is formed in the lower section, and the other in the upper section, the two portions being united by the pressure applied in forming the last portion, substantially in the manner set forth.

In testimony whereof I have signed my name to the foregoing specification in the presence of two subscribing witnesses.

J. H. REIGHARD.

Witnesses:
MYRON COAN,
WM. P. ROBINSON.